United States Patent [19]

Hede et al.

[11] Patent Number: 4,729,807

[45] Date of Patent: Mar. 8, 1988

[54] METHOD OF FABRICATING COMPOSITE PRODUCTS

[75] Inventors: Hans Hede; Gunnar Blomqvist; Jarl-Erik Jofs, all of Vaasa, Finland

[73] Assignee: Oy Wiik & Hoglund AB, Vaasa, Finland

[21] Appl. No.: 706,785

[22] Filed: Feb. 28, 1985

[30] Foreign Application Priority Data

Jun. 22, 1984 [CA] Canada ................................. 457308

[51] Int. Cl.⁴ ..................... B65H 81/00; B29C 47/06; B29C 59/00; B29C 67/12
[52] U.S. Cl. .................................. 156/172; 156/187; 264/45.9; 264/129; 264/171; 264/209.1; 264/209.3; 264/211; 264/284
[58] Field of Search ................ 264/45.9, 176 R, 129, 264/171, 211, 209.1, 209.8, 209.3, 284; 156/187, 172, 213, 212

[56] References Cited

U.S. PATENT DOCUMENTS

| | | | |
|---|---|---|---|
| 2,932,323 | 4/1960 | Aries | 264/176 R X |
| 3,331,900 | 7/1967 | Thomas | 264/45.9 X |
| 3,411,981 | 11/1968 | Thomas | 264/45.9 X |
| 3,494,989 | 2/1970 | Le May | 264/299 X |
| 4,104,095 | 8/1978 | Shaw | 156/172 X |
| 4,107,247 | 8/1978 | Dukess | 264/45.9 |
| 4,221,624 | 9/1980 | Eslinger et al. | 264/45.9 X |

OTHER PUBLICATIONS

Brydson, J. A. *Flow Properties of Polymer Melts*, London, Tliffe Books, ©1970, pp. 69–77.

*Primary Examiner*—Philip Anderson
*Attorney, Agent, or Firm*—Zarley, McKee, Thomte, Voorhees & Sease

[57] ABSTRACT

The invention provides a method of forming composite products of two incompatible plastics or other materials by extruding a first stream of plastic through a die to form a profile and coextruding another stream on the surface thereof which is fusible with the first plastic and is impregnated with foreign matter and causing, by means of high heat, pressure drop or shear stress, a rupture of the layer to form a pattern of irregular cavities and projections to which a coating can be applied which will invade the cavities and surround the projections to bond with the extruded profile.

7 Claims, 6 Drawing Figures

METHOD OF FABRICATING COMPOSITE PRODUCTS

This invention relates to the structure and method of fabricating composite plastic products such as tubes, pipes, sheets or bands. In particular, it relates to techniques for fabricating pipes or tubes having two layers which are mutually disinclined to bond to each other.

The variety of properties which can be achieved in different types of plastics leads logically to attempts to fabricate articles which combine two or three or more different properties by using laminates or composite layers. It has therefore long been recognized that it would be desirable to manufacture pipe which combines the light weight high strength and rigidity of a glassfibre reinforced thermosetting resin with the resilient chemical and abrasive resistant properties of a thermoplastic such as polyethylene.

Since the former is less resistant to chemicals, especially under conditions of stress and abrasion, and the latter is less rigid, especially at high heat, a fibreglass reinforced thermosetting plastic with a polyethylene liner is an example of a product which would offer an attractive combination of properties.

Attempts to achieve such a product have, however, been largely unsuccessful. First of all it is realized that polar resins such as polyester commonly used in glassfibre reinforced plastics do not easily bond with nonpolar thermoplastics such as polyolefins. As a result a "glassfibre" pipe with a polyethylene liner for example has been considered unworkable because the liner may be caused to collapse and separate away due to thermal expansion or under vacuum conditions forming an undesirable blockage in the pipeline or causing the liner to split or rupture. Depending on the use, other undesirable situations may arise where the liner and the outer shell are sufficiently bonded because they are not fusible. For instance one layer, through expansion or stretching, may end up longer or shorter than the other at the ends of pipe lengths making it difficult to form proper connections.

Some attempts have been made to improve the bonding by machining or embossing a pattern of grooves on one surface into which the adjacent plastic invades. But even this technique does not provide sufficient bonding without a recessed or undercut shape which is difficult to achieve in an automatic process commonly desirable in the manufacturing of plastic articles which are so adaptable to extrusion processes.

Some chemical bonding can be achieved by special techniques such as treatment with open flame or a corona discharge. However, these bonding techniques are difficult, unreliable (especially if the surface is smooth), and tend to diminish over a period of time rendering the product unreliable or unsafe as it gets older.

It is the purpose of this invention to overcome the foregoing difficulties and to provide a composite article such as pipe or other shapes in which two layers of plastic materials with low affinity for bonding may be combined to provide the light weight rigid high strength characteristics of one and the resilient chemical and abrasive resistance of the other. It is also the object of this invention to provide a method of fabricating such a composite article by efficient and cost competitive means such as extrusion.

It is a further purpose of this invention to provide a method whereby two non-fusible plastic layers may be formed in a composite pipe with a degree of mechanical bonding which renders them safe, reliable, and structurally sound.

These objects and other advantages are sought to be achieved with the present invention which provides a method of forming composite products of two non-fusible materials, meaning those which have very little affinity or are disinclined to bond to each other. The method comprises the steps of extruding a first stream of a first plastic through a die to form a profile, while coextruding another stream of plastic as a layer on said first stream, said other plastic stream being fusible with said first plastic and impregnated with an additive capable of interrupting the homogeneous texture thereof, and then causing said other stream of plastic to rupture upon emersion from said die to form a pattern of irregular cavities and projections, and then applying a coating on said ruptured layer of a second material so that said second material invades said cavities and surrounds the projections to form the bonded composite product when it hardens.

In one embodiment of the invention a blowing agent is used in the other stream which, due to the high temperature and the pressure drop at the outlet of the orifice, will cause expansion of the blowing agent so that the voids will rupture.

A further refinement of the invention may be employed by cooling the area of the die near the outlet so that the die is cooler than the melt stream thereby causing a degree of friction and shear stress in the other stream of plastic. Because of the additive which creates an interruption in the homogeneous texture of the plastic stream, that stream will tend to tear apart and rupture forming a rough surface. Thus, it can be seen that the additive need not be a blowing agent but can be any material which causes a weakness in the texture of the plastic so that it will break up.

It may also be modified to include additive material in the other layer which has an affinity for the second plastic, and because it remains embedded in the other layer, provides some adhesion to the second plastic coating.

The first stream may be extruded in the form of a profile such as cylindrical pipe, or may be in the form of flat sheets, or long narrow bands which can be helically wound to form the inner layer of a composite pipe.

This technique may be used to form bonded composite products of a variety of mutually non-fusible materials. For example, non-polar polyolefins which are difficult to bond to other products and which may be formed with a rough surface in accordance with the method of the present invention include such common plastics as polyethylene and polypropylene.

Examples of a second material which may be desirable to combine with the foregoing but which are often non-fusible therewith include concrete, polar-thermosetting resins such as polyester, and insulating material such as cellular polyurethane, polyvinyl chloride, phenolic resin, and expanded polystyrene.

The invention may be better understood by the following description of one embodiment thereof, directed to the production of a composite cylindrical pipe, with reference to the drawings in which.

Figure 1:
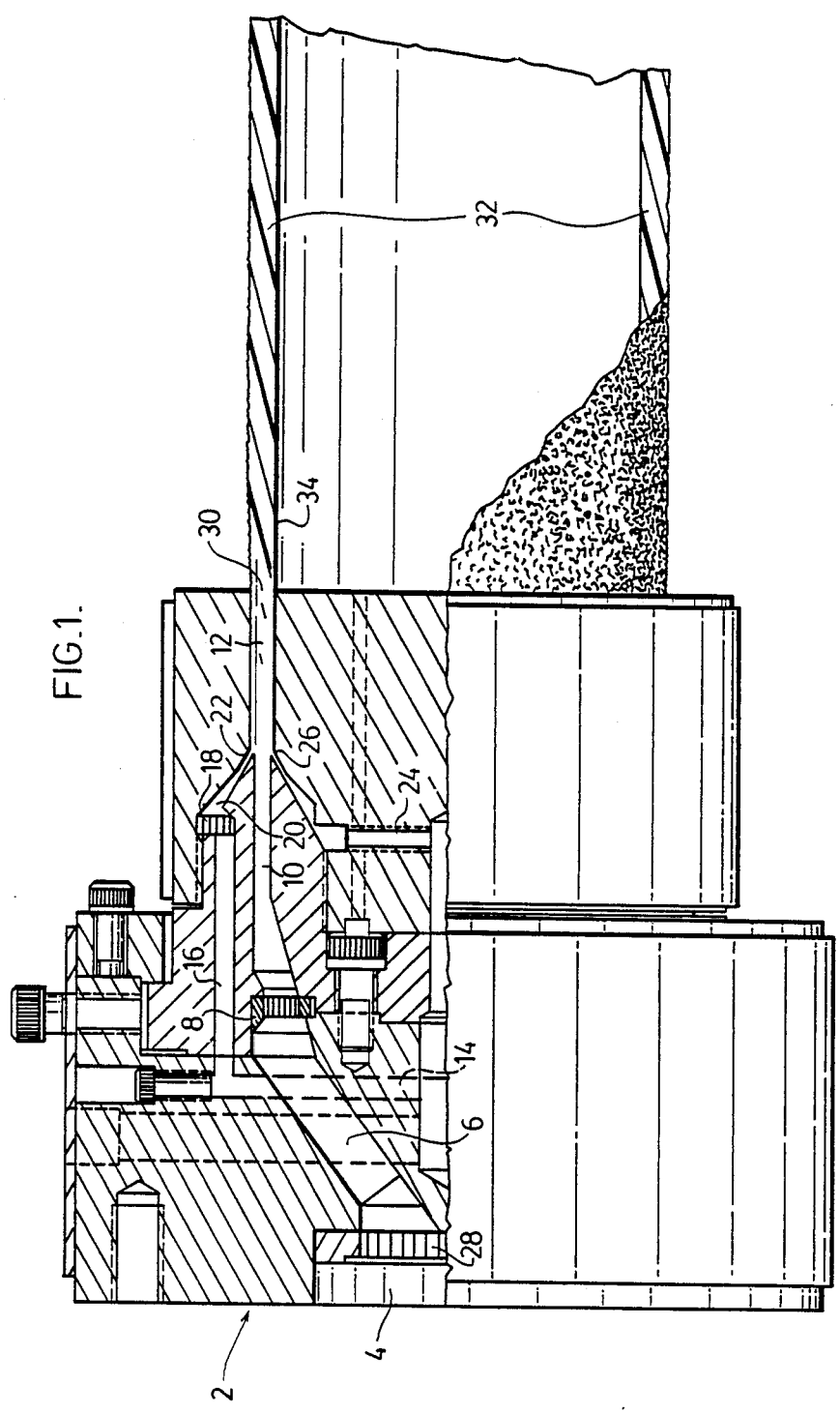
FIG. 1 is a cross-sectional view of an extrusion head useful in the process of making a composite pipe.

The extrusion die head illustrated in FIG. 1 is the type which is typically connected to an extruder designed to feed hot molten plastic to the die. The body 2 of the die in FIG. 1 has an inlet 4 from the extruder connecting to a main passage 6. In the illustrated die perforated rings 8 and 28 are employed to screen and blend the material flowing therethrough and the main channel 6 tapers to a narrower more uniform cross-sectional portion 10 and leads into the orifice channel 12 which is also of uniform cylindrical cross-sectional dimension.

While the orifice channel 12 would, in a usual situation of a cylindrical tube, be continuous around the entire circumference, the channel 6 may be one of two, or three or four or more, spaced at radial intervals around the axis, of similar configurations.

In the illustrated die a second channel 14 is provided which leads through a horizontal channel 16 to a perforated ring 18 and a converging portion 20 and eventually leads to an outlet 22 immediately adjacent the outer periphery of the exit from the main channel 10 at the upstream end at the outer periphery of the orifice channel 12.

The illustrated die is provided with a third channel 24 which leads to an exit 26 immediately in front of the inner periphery of the orifice channel 12. However, for purposes of the preferred embodiment process described herein, this third channel will be closed off and unused.

In operation, molten plastic such as polyethylene will be fed from the extruder barrel to the die head entrance 4 where a perforated disc 28 will cause the stream to be divided into a number of channels creating further blending and screening and will then pass into the main channel 6 through a second perforated ring 8 and eventually through the channel 10 and into the orifice channel 12 where it emerges at the outlet 30 as, in this example, a circular ring or tube of continuous or indefinite length.

As is well known to those skilled in the art, an extrusion of this type is typically then fed through a calibrator and a cooling bath to maintain the proper dimensions and shape of the extrusion while the plastic is allowed to cool and harden to the point where it is rigid enough to maintain its shape. The cooling and calibration is therefore not illustrated herein.

In this illustrated embodiment a second stream of molten plastic (ideally from a second extruder) also of polyethylene, but containing in the order of 0.5 to 3 or 4% of a blowing agent mixed therein, is fed through the channels 14 and 16 and through the perforated ring 18 to the outlet 22 where it becomes coextruded as an outer layer on the main stream flowing from channel 10.

It should be realized that because of the viscosity of the plastic, friction against the walls of the channels through the die and restrictions therein, considerable pressure is required to cause the flow to the outlet 30. Depending on the viscosity of the polyethylene, this pressure may be as high as approximately 200 to 400 kilograms per square centimeter at the entrance to the orifice opposite 22 and will decrease during passage along the channel 12 to a point just before the exit 30 where it drops sharply to about zero. Temperatures throughout the die from 4 to 30 will typically be in the range of 210 to 230° C.

This high temperature would otherwise cause the blowing agent to decompose or a liquid to vapourize and expand but the high pressures encountered within the die will prevent it from doing so. However, as the extruded material reaches the exit 30 or the orifice, pressure is suddenly released and the entrapped blowing agent in the outer layer coming from the channels 14, 16 and 20 will, under the influence of high temperature and as a result of the suddenly relaxed pressure, volatize and expand forming a vast number of small ruptured bubbles over the entire outer surface of the extruded pipe.

While the blowing agent causes voids in the outer layer, some of which will errupt or break open, the friction of the wall of the channel 12 against the surface of the outer layer will create shear stresses in the polyethylene which will also cause the voids to rupture.

It has been found that this is especially true if the walls of the channel 12 are cooled below the temperature which normally exists (i.e. below the temperature of the melt stream). The resulting shear stresses will cause the voids to burst and connecting bridges between the voids to break. As a result there will be formed on the surface a pattern of irregular projections and cavities, many of which will have undercut profiles, due to the rebound or "snap-back" reaction of the plastic in its elastic state.

Figure 2:
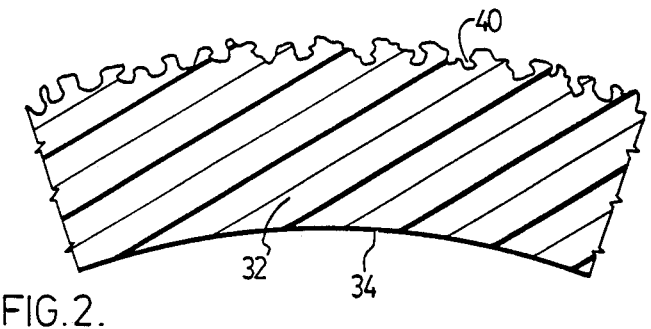
FIG. 2 is a cross-sectional view of a section of plastic profile as it emerges from the die head in FIG. 1.

Thus, unlike the typical smooth surface of an extruded plastic profile, the pipe made in this way will have an extremely rough surface having thousands of minor projections and indentations, some of which will have re-entrant or recessed shapes such as illustrated at 40 in FIG. 2.

Since the two streams are of like (or at least fusible) material, there will be a substantial, if not complete, fusing of the two layers so that the thickness of the pipe wall 32 will be substantially homogeneous and structurally united, ready to be covered by a second material.

We have found that such a rough surface provides an ideal means for mechanically bonding to the outer surface of the pipe 32 materials which would otherwise be difficult or impossible to bond or fuse such as polar thermosetting resins like epoxy or polyester of the type used in glassfibre reinforced plastic.

Figure 3:
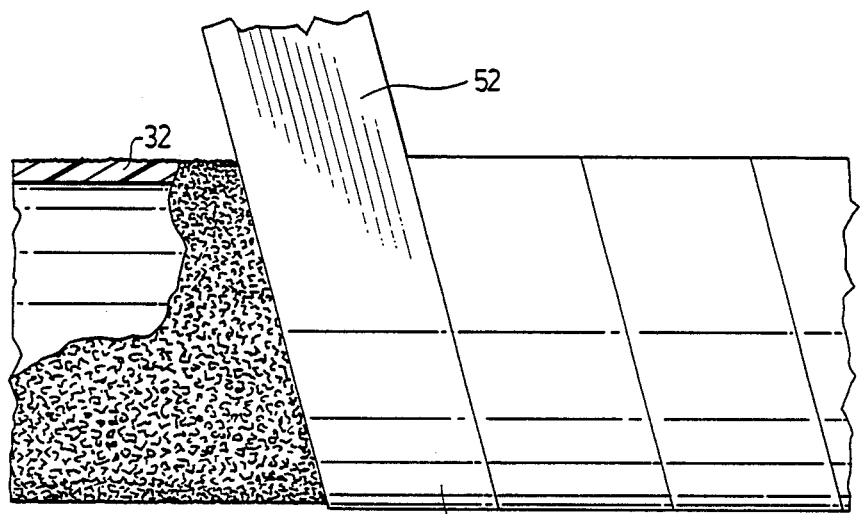
FIG. 3 illustrates schematically a further stage in the process of forming a composite pipe with the profile illustrated in FIG. 2.

FIG. 3 illustrates schematically how a pipe such as that illustrated in FIG. 1 may be turned into a composite pipe by first applying a layer of thermosetting resin and then a filament wrapping of a second layer 50 (using techniques which are well known in the pipeline technology) which may consist of, for instance, a glassfibre 52 impregnated with epoxy or polyester thermosetting resins.

Alternatively, a mixture of thermosetting resin and glassfibres may be "pulltruded" over the inner pipe 32 by known means in which the inner pipe is passed through the pulltruder and a layer of the outer resin is deposited thereon and cured. Other techniques may also be applicable such as spraying a mixture of resin and glassfibre on the outer surface as the pipe is advanced.

Which ever coating method is used, the result is a composite pipe comprising an inner layer of polyolefin (here polyethylene) well known for its chemical resistance and abrasive resistance which is capable of protecting the glassfibre reinforced polyester layer. Conversely, the glassfibre reinforced polyester layer is a light weight means of providing substantial hoop strength, impact resistance, stiffness, and rigidity which the more resilient and flexible polyethylene could not provide.

Figure 4:
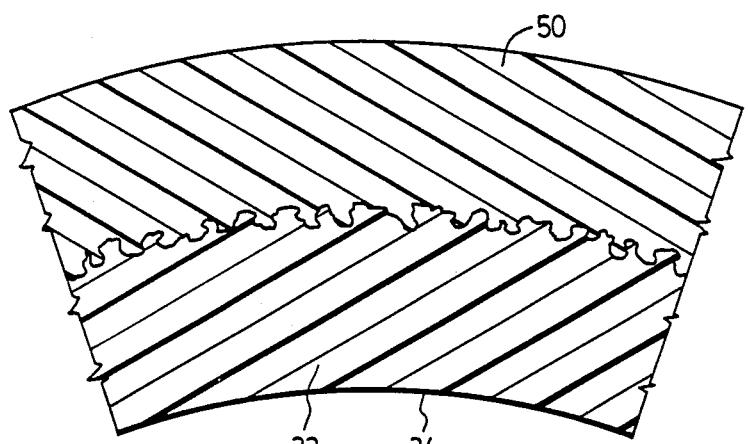
FIG. 4 illustrates a cross-sectional view of a section of the composite pipe formed by the method and apparatus illustrated in FIGS. 1, 2 and 3.

Furthermore, by means of the techniques described herein, the two layers which normally would be difficult to bond together are nevertheless firmly mechanically bonded by virtue of the rough irregular surface of the inner pipe 32. The irregular projections sticking out from the inner pipe are embedded in the overlying resin of the outer layer 50 and indentations and re-entrant cavities of the inner pipe are invaded by portions of the polyester resin, as can be seen illustrated in FIG. 4.

Figure 5:
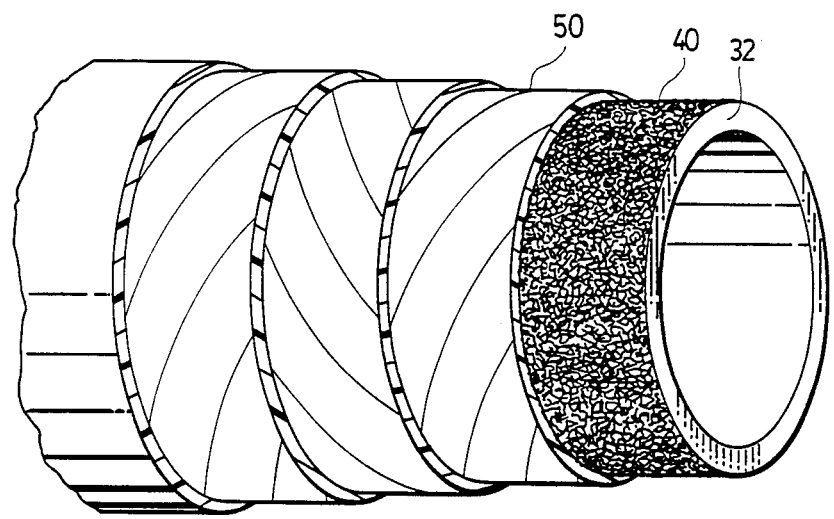
FIG. 5 is a perspective view showing the structure of such a composite pipe.

FIG. 5 illustrates the structure of a pipe in which a polyester liner 32 with a rough surface 40 is covered on the outside by several layers of glassfibre reinforced polyester such as 50.

While the foregoing describes a composite pipe in which the rough outer surface is covered with a second layer, the die illustrated in FIG. 1 could be used to produce a rough texture on the inner surface 34 of the pipe by passing a stream of polyethylene mixed with blowing agents through the channel 24 to the exit 26 in a process similar to that previously described.

Such a structure might be useful, for instance, to fix a core pipe inside a polyethylene jacket where the annulus is to be filled with foam insulation.

Experimentation with the foregoing techniques has provided examples of typical manufacturing conditions and results which are summarized in Table I.

For instance in Example 1 an inner layer of high density polyethylene having a melt flow index of 0.5 (measured at 190° C./5 kg.) and a density of 0.95, at a melt temperature of 220° C. was used to produce a pipe with an inside diameter of 130 mm. and a wall thickness of 4.5 mm. A coextruded outer layer of high density polyethylene having a melt flow index of 0.8 (190° C./2.16 kg.) and a density of 0.95 with 0.8% azodicarbonamide blowing agent at a melt temperature of 225° produced a textured surface approximately 0.5 mm. thick with approximate maximum peak height of 1.7 mm.

TABLE I

EXAMPLES OF TYPICAL MANUFACTURING CONDITIONS AND RESULTS

| RAW MATERIAL | MFI 190/5 °C./kg | MFI 190/2.16 °C./kg | MFI 230/5 °C./kg | Density | Blowing Agent or Filler | Melt Temp. °C. | Max. Peak Height Approx. | Adhesion to PET DIN 16964 Part 3 | φ Pipe Inside diam. | Nominal thickness mm. |
|---|---|---|---|---|---|---|---|---|---|---|
| EXAMPLE I | | | | | | | | | | |
| Outer layer HDPE (UNIFOS-DNDS-5140) | 2.8 | 0.8 | | 0.95 | 0.8% | 225 | 1.7 | 6.3 | 130 | 0.5 |
| Inner layer HDPE (Hostalen GM 5010 T2) | 0.5 | | | 0.95 | | 220 | Tight Texture | | 130 | 4.5 |
| Azodicarbonamide (Genitron EPE) | | | | | x | | | | | |
| EXAMPLE II | | | | | | | | | | |
| Outer layer HDPE (UNIFOS DGDS 2466) | 0.4 | | | 0.95 | | 220 | | | 200 | 3 |
| Inner layer PE (UNIFOS DGDS 2418) | | 0.2 | | 0.94 | 3.5% | 215 | 2.4 Open Texture | 5.5 | 200 | 0.2 |
| Natriumbicarbonate | | | | | x | | | | | |
| EXAMPLE III | | | | | | | | | | |
| Outer layer PP (Hostalen PPK 0160) | | | 4.0 | 0.91 | 0.5% | 225 | 1.5 | 5.7 | 82 | 0.5 |
| Inner layer PP (Hostalen PPH 2222) | | | 1.0 | 0.91 | | 230 | | | 82 | 4 |
| Azodicarbonamide (Genitron EPA) | | | | | x | | | | | |
| EXAMPLE IV | | | | | | | | | | |
| Outer layer PP (Hostalen PPT 1070) | | | 27 | 0.91 | 0.6% | 210 | 0.7 | 5.3 | | 0.3 |
| Inner layer PP (Hostalen PPH 2222) | | | 1.0 | 0.91 | | 230 | | | | 6 |
| Azodicarbonamide (Genitron EPE) | | | | | x | | | | | |
| EXAMPLE V | | | | | | | | | | |
| One layer smooth pipe (Hostalen GM 5010 T2) | 0.5 | | | 0.95 | | 220 | | 0 | 160 | 15 |
| EXAMPLE VI | | | | | | | | | | |
| Outer layer LDPE (UNIFOS DGDS 6011) | | 0.3 | | 0.92 | 25% | 170 | 3.1 | 5.7 | 160 | 1.2 |
| Inner layer LDPE (UNIFOS 6011) | | 0.3 | | 0.92 | | 170 | | | 160 | 10 |
| Filler - PVC Powder | | | | | x | | | | | |
| REMARKS | | | | | | | | | | |
| Minimum standard requirement according to DIN 16964 Part 3 | | | | | | | | 3.5 | | |

While the foregoing preferred embodiment contemplates use of a blowing agent in the coextruded other stream which provides the outer layer on the polyethylene inner liner, it is possible to achieve substantially the same effect if other additives (by which we mean material which is not homogeneous with the stream of plastic) such as finely divided particles, droplets of water (although some consider water a blowing agent) and other types of fillers or fibres which will break up the homogeneous texture of the stream and impart to it inferior flowing properties so that under the influence of the shear stresses as the plastic flows through the die, the outer layer will be caused to rupture and break into a rough irregular surface. In this respect fillers with a low affinity to non-polar polyolefin resins will act almost in the same way as gas bubbles when the molten polymer emerges from the die gap, and will also cause voids in the surface of the outer layer.

A further refinement is to use particles of polar polymers like PVC since these have a good chemical affinity to the thermosetting resins and thus provide on this outer layer areas capable of bonding to the outer (in this case polyester) layer.

Figure 6:
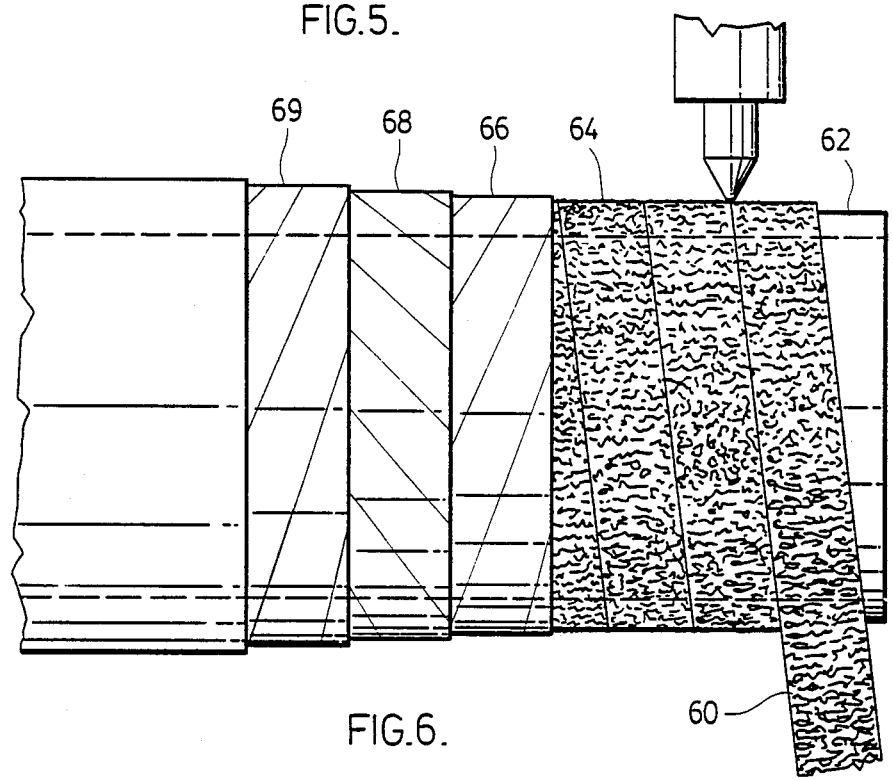
FIG. 6 illustrates another method of using the present invention to form composite pipes by helical wrapping.

While the preferred embodiment describes a pipe made by extruding a cylinder of polyethylene to form the inner liner which is then coated with glassfibre reinforced polyester on the outside by spraying, pulltruding, or helical wrapping, it is possible to make a form of pipe as illustrated in FIG. 6 in which the first extruded stream forms a thin flat narrow band 60 which is wrapped helically around a mandrel 62 to form a length of cylindrical tubing 64. This technique is especially useful where it is desirable to make a pipe of large diameter but relatively thin walls, a structure which would be inclined to collapse if not supported.

If the band 60 is extruded in accordance with the previously described method with an outer layer which is caused to rupture, the external surface of the pipe 64 will have a similar rough texture which can then be coated by a stiffer material such as glassfibre reinforced polyester, as illustrated at 66. Additional layers are illustrated at 68 and 69.

Although the preferred embodiment describes a method for coating the polyethylene liner with a second plastic such as polyester, it may be desirable to use other materials which would normally bond poorly to a smooth polyethylene liner such as concrete or clay. Thus while the preferred embodiment has been described in terms of bonding incompatible (by which we mean a low affinity or inclination to bond) plastics, the foregoing method for creating a rough surface may have additional but similar applications for the forming of composite articles which need not be cylindrical profiles such as pipe.

By means of the foregoing procedures, it is possible to produce a plastic profile having a rough textured surface by a relatively fast automatic cost efficient system of extrusion, and by combining this rough textured profile with a second plastic layer in its uncured state, it is possible to provide composite pipe or other article which combines the properties of two different types of plastic. The difficulties of bonding two incompatible plastics are overcome to provide an article of product which is safe, reliable and durable.

It will of course be appreciated that modifications and variations in the process and resulting product may be employed without departing from the inventive concept herein.

What we claim as new and desire to protect by Letters Patent of the United States is as follows:

1. A method of fabricating bonded composite products composed of a plurality of materials with a low affinity for mutual bonding, comprising the steps of:
    extruding a first stream of a first plastic through a die to form a profile, coextruding a second stream of plastic through said die which is fusible with said first stream as a surface layer on said profile, said second stream being blended with an additive capable of interrupting the homogeneous structure of said plastic;
    allowing said surface layer to rupture upon emergence from the die, as a result of pressure drop and shear stresses due to friction at the surface of the die, so as to form a rough surface comprising a pattern of irregular projections and cavities;
    applying a flowable coating of a second plastic material, with a low bonding affinity for said first plastic, on to said rough surface to surround said projections and invade said cavities;
    hardening said coating material.

2. A method as claimed in claim 1 in which said additive comprises one of a group consisting of a blowing agent and a particulate filler, said particulate filler being one of a group consisting of powdered mineral and powdered PVC.

3. A method as claimed in claim 1 in which said surface layer is caused to rupture by a combination of high temperature, which causes blowing agents to expand, the sudden reduction of high extrusion pressure upon emergence from the die orifice, and shear stresses due to friction caused by cooling of the die.

4. A method as claimed in claim 1 in which the surface layer of said plastic profile is composed of a non-polar thermoplastic polyolefin and said second plastic material is composed of a polar thermosetting resin.

5. A method as claimed in claim 1 in which said profile is a cylindrical tube of polyethylene and said coating is a helical wrapping of glassfibre reinforced polyester.

6. A method as claimed in claim 1 in which said second stream contains the same plastic as said first stream.

7. A method as claimed in claim 1 in which said surface layer is caused to rupture by at least one of the following techniques namely, (a) use of high heat in the second stream to cause the blowing agents to expand on emergence from the die; (b) reduction of high pressure within the die immediately upon emergence from the die orifice; (c) the creation of shear stresses due to friction caused by cooling of the die.

* * * * *

UNITED STATES PATENT AND TRADEMARK OFFICE
CERTIFICATE OF CORRECTION

PATENT NO. : 4,729,807
DATED : March 8, 1988
INVENTOR(S) : Hans HEDE, Gunnar BLOMQVIST, JARL Erik JOFS It is certified that error appears in the above—identified patent and that said Letters Patent is hereby corrected as shown below:

Column 8, line 36, change "blowing agent" to

--said additive which in this instance is a blowing agent--.

Signed and Sealed this

Twenty-ninth Day of August, 1989

*Attest:*

DONALD J. QUIGG

*Attesting Officer*  *Commissioner of Patents and Trademarks*